US007684821B2

(12) United States Patent
Mousseau et al.

(10) Patent No.: US 7,684,821 B2
(45) Date of Patent: Mar. 23, 2010

(54) MULTI-TAP KEYBOARD USER INTERFACE

(75) Inventors: Gary Mousseau, Waterloo (CA); Thanh Vuong, Kitchener (CA)

(73) Assignee: Research In Motion Limited, Waterloo (CA)

( * ) Notice: Subject to any disclaimer, the term of this patent is extended or adjusted under 35 U.S.C. 154(b) by 390 days.

(21) Appl. No.: 11/235,367

(22) Filed: Sep. 27, 2005

(65) Prior Publication Data
US 2007/0072647 A1 Mar. 29, 2007

(51) Int. Cl.
*H04M 1/00* (2006.01)
(52) U.S. Cl. ............... 455/550.1; 455/556.2; 455/525; 455/557; 455/566; 455/564; 455/466
(58) Field of Classification Search ............... 455/557, 455/556.2, 550.1, 556.1, 525, 566, 158.5, 455/550, 466, 556, 158, 433.01, 564, 456; 379/433.01; 710/67; 376/46
See application file for complete search history.

(56) References Cited
U.S. PATENT DOCUMENTS

| 3,929,216 | A | * | 12/1975 | Einbinder | 400/484 |
|---|---|---|---|---|---|
| 5,025,403 | A | * | 6/1991 | Stephens | 708/137 |
| 6,219,731 | B1 | * | 4/2001 | Gutowitz | 710/67 |
| 6,310,608 | B1 | * | 10/2001 | Kaply et al. | 345/168 |
| 6,401,209 | B1 | * | 6/2002 | Klein | 726/34 |
| 6,782,280 | B1 | * | 8/2004 | McKay | 455/566 |
| 7,338,224 | B2 | * | 3/2008 | Jones et al. | 400/489 |

(Continued)

FOREIGN PATENT DOCUMENTS
EP 1 480 420 11/2004

(Continued)

OTHER PUBLICATIONS

European Search Report issued by the European Patent Office dated Mar. 10, 2006 for corresponding European Patent Application No. 05 108 925.8 filed Sep. 27, 2005.

(Continued)

*Primary Examiner*—Rafael Pérez-Gutiérrez
*Assistant Examiner*—Joseph Arevalo
(74) *Attorney, Agent, or Firm*—Gowling Lafleur Henderson LLP

(57) ABSTRACT

There is provided a multi-tap keyboard user interface with auditory feedback. In one embodiment, there is provided a method for controlling operation of a mobile device having a plurality of input devices, comprising associating groups of one or more keys of the input devices to define at least one input region and in response to an input received from said input devices, performing an associated action for operating the device, responding equally to any input from a same input region. A repeated input (multi-tap) to a same input region cycles through a plurality of actions associated with the input region. Auditory feedback comprising a vocalized description of the action is provided. The multi-tap keyboard user interface with auditory feedback may adapt a mobile device (e.g. PDA or smart phone) for use by visually impaired users.

7 Claims, 16 Drawing Sheets

U.S. PATENT DOCUMENTS

| | | | |
|---|---|---|---|
| 2002/0091569 A1* | 7/2002 | Kitaura et al. | 705/14 |
| 2003/0076244 A1* | 4/2003 | Motoe | 341/22 |
| 2003/0107555 A1* | 6/2003 | Williams | 345/169 |
| 2003/0128188 A1* | 7/2003 | Wilbrink et al. | 345/158 |
| 2004/0146272 A1* | 7/2004 | Kessel et al. | 386/46 |
| 2004/0171405 A1* | 9/2004 | Amano et al. | 455/556.2 |
| 2004/0177179 A1* | 9/2004 | Koivuniemi | 710/67 |
| 2004/0204075 A1* | 10/2004 | Rusnak et al. | 455/557 |
| 2004/0263479 A1* | 12/2004 | Shkolnikov | 345/169 |
| 2005/0003867 A1* | 1/2005 | McKay | 455/566 |
| 2005/0164735 A1 | 7/2005 | Kimura | |
| 2005/0191988 A1* | 9/2005 | Thornton et al. | 455/404.1 |
| 2006/0033718 A1* | 2/2006 | Griffin | 345/168 |

FOREIGN PATENT DOCUMENTS

| | | |
|---|---|---|
| WO | 01/44912 | 6/2001 |

OTHER PUBLICATIONS

Communication under Rule 71(3) EPC issued by the European Patent Office dated Jul. 28, 2008; Decision to Grant of a Patent for corresponding European Patent Application No. 05 108 925.8 filed Sep. 27, 2005.

* cited by examiner

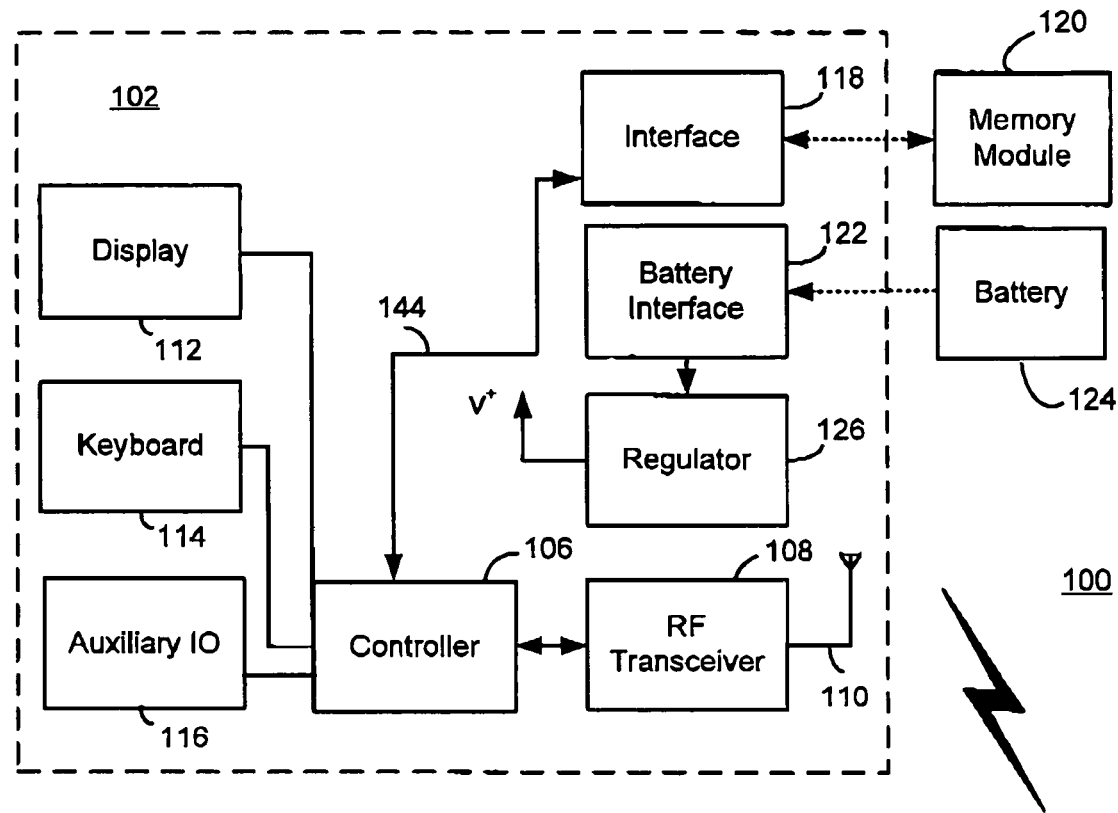
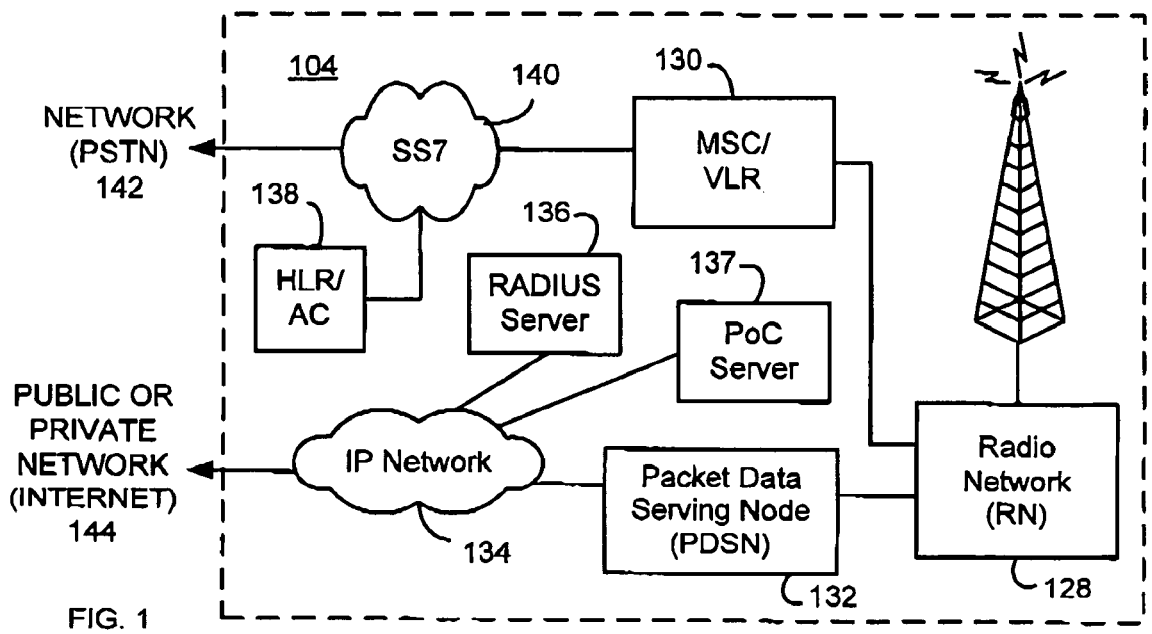
FIG. 1

_US 7,684,821 B2_

MULTI-TAP KEYBOARD USER INTERFACE

FIELD

The present relates generally to user interfaces for wireless communication devices and, more particularly, to methods and apparatus for a multi-tap keyboard user interface with auditory feedback.

DESCRIPTION OF THE RELATED ART

Wireless communication devices such as mobile devices providing voice communications, data communications or both in a wireless communication network are increasingly prevalent in modern society. Such devices may also provide additional personal digital assistant (PDA) functions such as a calendar, alarm, contact lists, calculators, etc. often these types of devices generally have between 30 and 40 keys that have been compacted together to produce a keyboard effect that simulates a QWERTY, DVORAK or other common keyboard. To maintain a compact mobile phone form-factor the keys have become sufficiently reduced in size so as to be almost usable on some of the newer models. Due to these tight design choices it is difficult to dial numbers or use the device with direct, strong visual confirmation of what key is being pressed.

It is desired to have a way to perform simple user keyboard operations without requiring direct visual confirmation of what key is being pressed. Such a user interface may be useful to assist visually impaired users to use the devices lending accessibility to such devices.

Accordingly, there is a resulting need for a method and apparatus that addresses one or more of these shortcomings.

BRIEF DESCRIPTION OF THE DRAWINGS

Embodiments will now be described by way of example with reference to attached figures, wherein:

FIG. 1 is a block diagram which illustrates pertinent components of a wireless communication network and a mobile device which communicates within this network;

DETAILED DESCRIPTION

Figure 2:
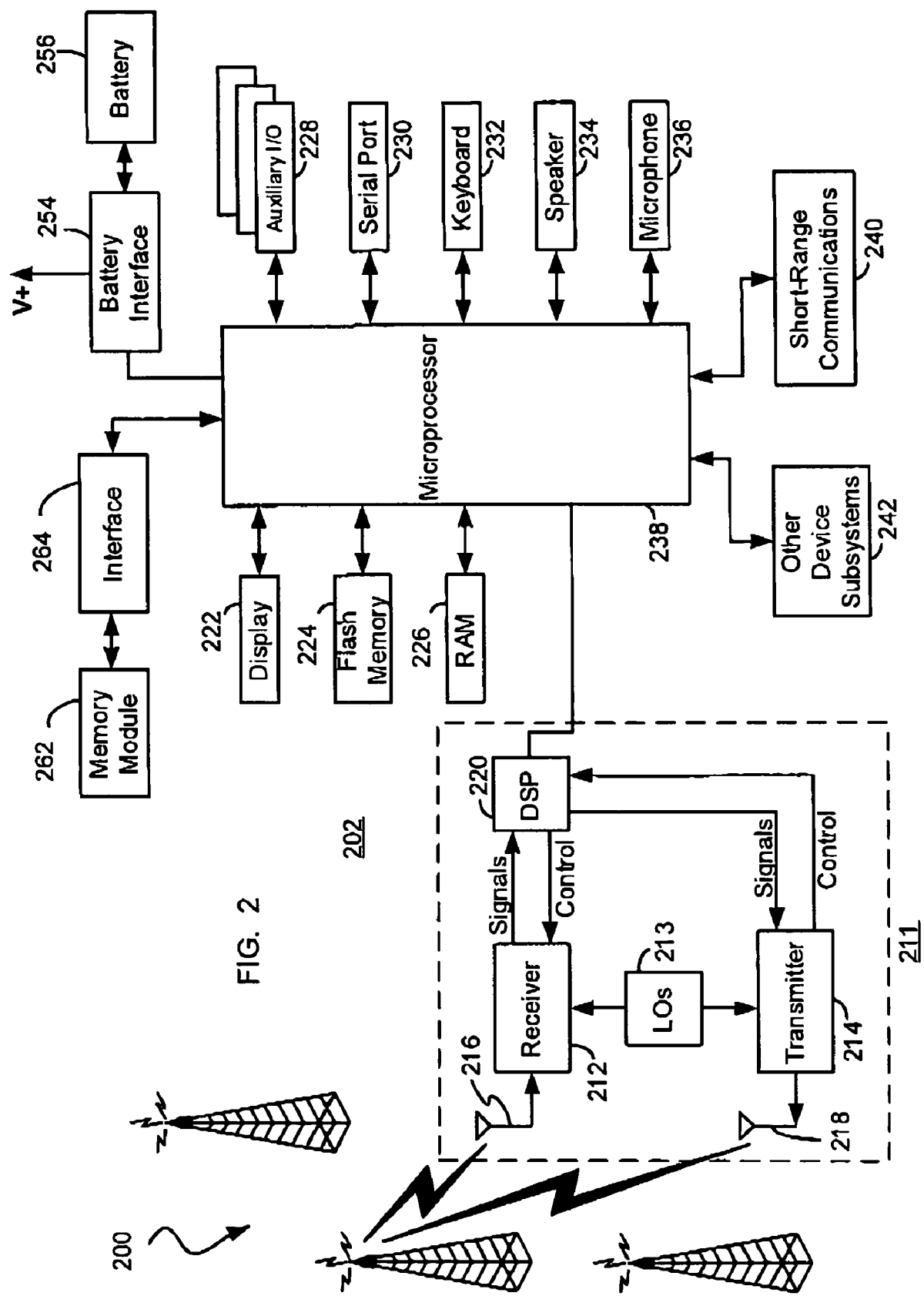
FIG. 2 is a detailed diagram of a mobile device which may communicate within the wireless communication network.

There is provided a multi-tap keyboard user interface with auditory feedback. In one aspect, there is provided a method for controlling operation of a mobile device having a plurality of input devices, comprising associating groups of one or more keys of the input devices to define at least one input region and in response to an input received from said input devices, performing an associated action for operating the device, responding equally to any input from a same input region. A repeated input (multi-tap) to a same input region cycles through a plurality of actions associated with the input region. Auditory feedback comprising a vocalized description of the action is preferably provided. The multi-tap keyboard user interface with auditory feedback may adapt a mobile device (e.g. PDA or smart phone) for use by visually impaired users.

Persons of ordinary skill in the art will recognize mobile device, method, computer program product and other aspects from the embodiments shown and described.

FIG. 1 is a block diagram of a communication system 100 which includes a mobile device 102 which communicates through a wireless communication network 104. Mobile device 102 preferably includes a visual display 112, a keyboard 114, and perhaps one or more auxiliary input/output (I/O) interfaces 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile device 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs.

Mobile device 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption it is also contemplated that RF transceiver circuitry 108 may perform certain functions in addition to those performed by RN 128. It will be apparent to those skilled in the art that RF transceiver circuitry 108 will be adapted to particular wireless network or networks in which mobile device 102 is intended to operate.

Mobile device 102 includes a battery interface 122 for receiving one or more rechargeable batteries 124. Battery 124 provides electrical power to electrical circuitry in mobile device 102, and battery interface 122 provides for a mechanical and electrical connection for battery 124. Battery interface 122 is coupled to a regulator 126 which regulates power to the device. When mobile device 102 is fully operational, an RF transmitter of RF transceiver circuitry 108 is typically turned on only when it is sending to network, and is otherwise turned off to conserve resources. Similarly, an RF receiver of RP transceiver circuitry 108 is typically periodically turned off to conserve power until it is needed to receive signals or information (if at all) during designated time periods.

Mobile device 102 operates using a memory module 120, such as a Subscriber Identity Module (SIM) or a Removable User Identity Module (R-UIM), which is connected to or inserted in mobile device 102 at an interface 118. As an alternative to a SIM or an R-UIM, mobile device 102 may operate based on configuration data programmed by a service provider into an internal memory which is a non-volatile memory. Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108 and antenna 110 may be implemented as a radio modem unit that may be inserted into a port on a laptop computer. In this case, the laptop computer would include display 112, keyboard 114, and one or more auxiliary I/O interfaces 116, and controller 106 may remain within the radio modem unit that communicates with the computer's CPU or be embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile device 102 may have a more particular implementation as described later in relation to mobile device 202 of FIG. 2.

Mobile device 102 communicates in and through wireless communication network 104. In the embodiment of FIG. 1, wireless network 104 is a Third Generation (3G) supported network based on Code Division Multiple Access (CDMA) technologies. In particular, wireless network 104 is a CDMA2000 network which includes fixed network components coupled as shown in FIG. 1. Wireless network 104 of the CDMA2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet). Wireless network 104 is exemplary and persons of ordinary skill in the art will appreciate that other wireless network architectures and standards may be used.

During operation, mobile device 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile devices within its cell. The base station transceiver system normally performs such functions as modulation and possibly encoding and/or encryption of signals to be transmitted to the mobile device in accordance with particular, usually predetermined, communication protocols and parameters, under control of its controller. The base station transceiver system similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile device 102. An RF channel is a limited resource that must be conserved, typically due to limits in overall bandwidth and a limited battery power of mobile device 102. Those skilled in the art will appreciate that a wireless network in actual practice may include hundreds of cells 120 depending upon desired overall expanse of network coverage. All pertinent components may be connected by multiple switches and routers (not shown), controlled by multiple network controllers.

For all mobile devices 102 registered with a is network operator, permanent data (such as mobile device 102 user's profile) as well as temporary data (such as a mobile device's 102 current location) are stored in a HLR/AC 138. In case of a voice call to mobile device 102, HLR/AC 138 is queried to determine the current location of mobile device 102. A Visitor Location Register (VLR) of MSC 130 is responsible for a group of location areas and stores the data of those mobile devices that are currently in its area of responsibility. This includes parts of the permanent mobile device data that have been transmitted from HLR/AC 138 to the VLR for faster access. However, the VLR of MSC 130 may also assign and store local data, such as temporary identifications. Mobile device 102 is also authenticated on system access by HLR/AC 138. In order to provide packet data services to mobile device 102 in a CDMA2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Wireless communication network 104 also includes a Push-to-talk over Cellular (PoC) server 137 which may be coupled to IP network 134. PoC server 137 operates to facilitate PoC individual and group communication sessions between mobile devices within network 104. A conventional PoC communication session involves a session connection between end users of mobile devices, referred to as session "participants", who communicate one at a time in a half-duplex manner much like conventional walkie-talkies or two-way radios.

Those skilled in the art will appreciate that wireless network 104 may be connected to other systems, possibly including other networks, not explicitly shown in FIG. 1. A network will normally be transmitting at the very least some sort of paging and system information on an ongoing basis, even if there is no actual packet data exchanged. Although the network consists of many parts, these parts all work together to result in certain behaviors at the wireless link. Though a CDMA wireless network 104 is described, network 104 may conform to any of the wireless network technologies and protocols including cellular, wide-area network, GSM, GPRS, CDMA, iDEN™, Mobitex™, etc.

FIG. 2 is a detailed block diagram of a preferred mobile device 202. Mobile device 202 is preferably a two-way communication device having at least voice and advanced data communication capabilities, including the capability to communicate with other computer systems. Depending on the functionality provided by mobile device 202, it may be referred to as a data messaging device, a two-way pager, a cellular telephone with data messaging capabilities, a wireless Internet appliance, or a data communication device (with or without telephony capabilities). Mobile device 202 may communicate with any one of a plurality of base station transceiver systems 200 within its geographic coverage area.

Mobile device 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in the field of communications, particular design of communication subsystem 211 depends on the communication network in which mobile device 202 is intended to operate.

Mobile device 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile device 202, and therefore mobile device 202 comprises a memory module 262, such as a Subscriber Identity Module or "SIM" card or a Removable User Identity Module (R-UIM), to be inserted in or connected to an interface 264 of mobile device 202 in order to operate in the network. Alternatively, memory module 262 may be a non-volatile memory which is programmed with configuration data by a service provider so that mobile device 202 may operate in the network. Since mobile device 202 is a mobile battery-powered device, it also includes a battery interface 254 for receiving one or more (rechargeable batteries 256. Such a battery 256 provides electrical power to most if not all electrical circuitry in mobile device 202, and battery interface 254 provides for a mechanical and electrical connection for it. The battery interface 254 is coupled to a regulator (not shown in FIG. 2) which provides power V+ to all of the circuitry.

Mobile device 202 includes a microprocessor 238 (which is one implementation of controller 106 of FIG. 1) which controls overall operation of mobile device 202. This control includes network selection techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile device 202. A predetermined set of applications which control basic device operations, including at least data and voice communication applications, will normally be installed on mobile device 202 during its manufacture. A preferred application that may be loaded onto mobile device 202 may be a personal information manager (PIM) application having the ability to organize and manage data items relating to user such as, but not limited to, e-mail, calendar events, voice mails, appointments, and task items. Naturally, one or more memory stores are available on mobile device 202 and SIM 262 to facilitate storage of PIM data items and other information such as described further herein with reference to FIG. 14.

The PIM application preferably has the ability to send and receive data items via the wireless network. In a preferred embodiment, PIM data items are seamlessly integrated, synchronized, and updated via the wireless network, with the mobile device user's corresponding data items stored and/or associated with a host computer system (not shown) thereby creating a mirrored host computer on mobile device 202 with respect to such items. This is especially advantageous where the host computer system is the mobile device user's office computer system. Additional applications may also be loaded onto mobile device 202 through network, an auxiliary I/O subsystem 228, serial port 230, short-range communications subsystem 240, or any other suitable subsystem 242, and installed by a user in RAM 226 or preferably a non-volatile store such as flash memory 224 for execution by microprocessor 238. Such flexibility in application installation increases the functionality of mobile device 202 and may provide enhanced on-device functions, communication-related functions, or both. For example, secure communication applications may enable electronic commerce functions and other such financial transactions to be performed using mobile device 202.

In a data communication mode, a received signal such as a text message, an e-mail message, or Web page download will be processed by communication subsystem 211 and input to microprocessor 238. Microprocessor 238 will 3.5 preferably further process the signal for output to display 222 or alternatively to auxiliary I/O device 228. A user of mobile device 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile device 202 is substantially similar, except that the received signals are output to speaker 234 and signals for transmission would be generated by microphone 236. Alternative voice or audio I/O subsystems, such as a voice message recording subsystem, may also be implemented on mobile device 202. Although voice or audio signal output is preferably accomplished primarily through speaker 234, display 222 may also be used to provide an indication of the identity of a calling party, duration of a voice call, or other voice call-related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile device 202 by providing for information or software downloads to mobile device 202 other than through a wireless communication network. The alternate download path may, for example, be used to load an encryption key onto mobile device 202 through a direct and thus reliable and trusted connection to thereby provide secure device communication.

Short-range communications subsystem 240 of FIG. 2 is an additional optional component which provides for communication between mobile device 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

In accordance with an embodiment, mobile device 202 is a multi-tasking wireless communications device configured for sending and receiving data such as electronic mail, instant messages, SMS messages, and other data messages and for making and receiving voice calls. To provide a user-friendly environment to control the operation of mobile device 202, an operating system (not shown) resident on device 202 provides a user interface such as a graphical user interface (GUI) having a main screen and a plurality of sub-screens navigable from the main screen.

Figure 3:
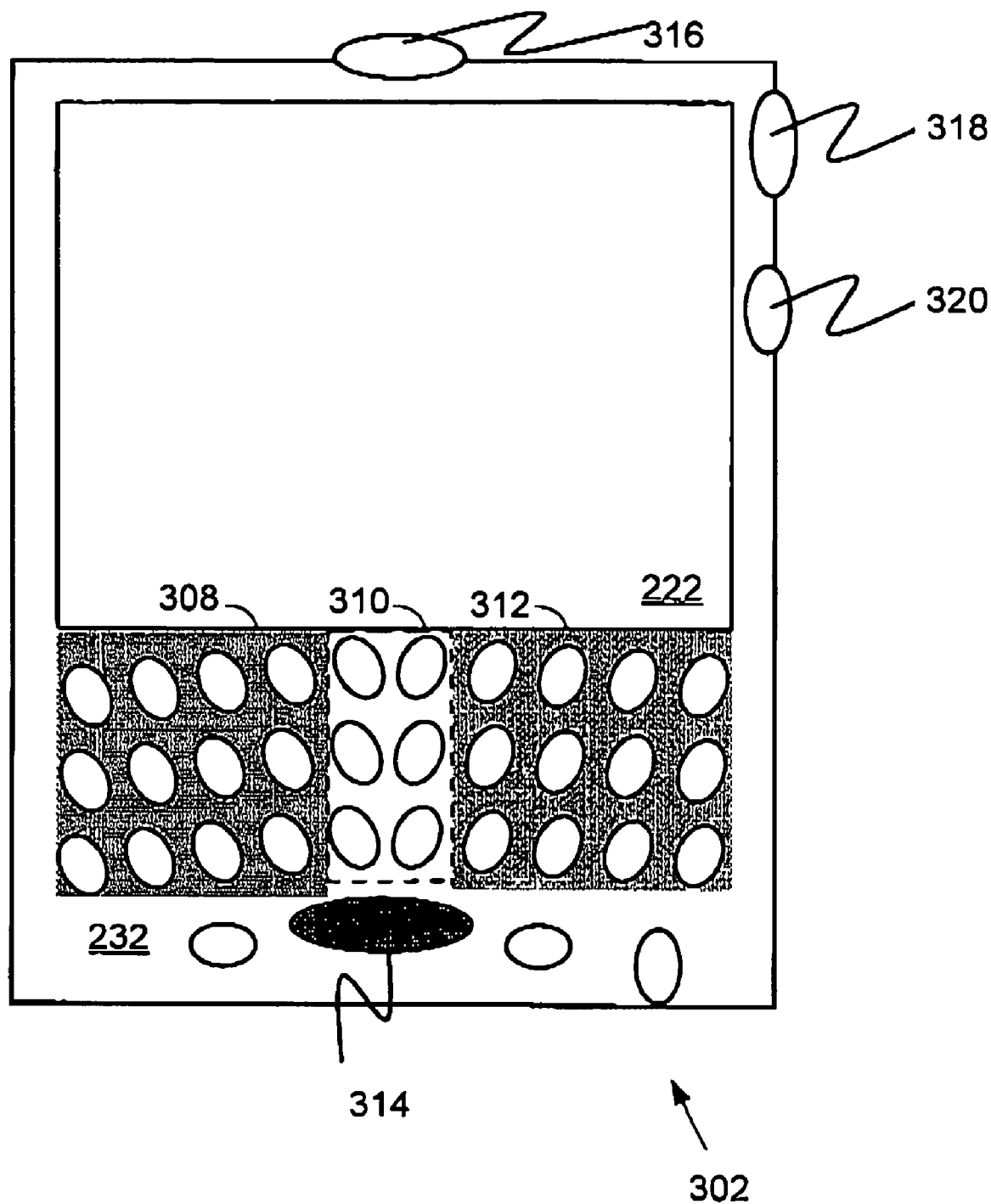
FIG. 3 illustrates an exterior view of a mobile device showing a distribution of keyboard keys to input regions in accordance with an embodiment.

In accordance with an embodiment, device 202 is adapted to provide a multi-tap input user interface. FIG. 3 illustrates an exterior view 302 of an example of mobile device 202. Keyboard 232 is adapted, using software, to present groups of one or more keys as a plurality of input regions 308, 310, 312 and 314 to provide physically distinct regions of the device to be used for simple input tasks. Other keys of keyboard 232 and auxiliary I/O 228 (e.g. buttons such as confirm (or telephone) button 316, cancel button 320, and action button 318 of a clickable thumbwheel, etc.) may also be used to assist with such input as further described.

Actions are associated with the input regions and buttons and, preferably, an auditory response confirmation is provided to assist with the input and/or action associated therewith. The auditory response is preferably a description (e.g. vocalization in a natural language) of the input/action delivered via a n output device such as a speaker 234 or ear-bud (not shown) when available. It is expected that due the nature of the input required, a multi-tap solution is best used with an ear-bud as holding device 202 up to the ear whilst inputting using keyboard 232 would make entering information difficult.

The embodiment shown in FIG. 3 illustrates one manner of grouping keys to define input regions 308-314 with respective associated actions for a multi-tap input user interface. FIG. 3 denotes the regions using gray scale for purposes of representation only. Device 202 may be physically adapted using sensorial techniques such as color, shape and/or tactile effects to denote the input regions if desired.

In the present embodiment, input region 310 in the middle area of keyboard 232 is defined as a 'dead zone' to separate keyboard 232 into two active halves comprising active input regions 308 and 312. Key 314 (typically a space key on a standard keyboard) defines the fourth region 314. In the present embodiment, input region 310 is not associated with an action or may be associated with a null action that results in no change to the operation of device 202. Alternatively an auditory response may be associated to warn that a dead zone input was received.

To initiate the multi-tap input user interface, a defined key sequence may be pressed. Other activation methods may be used. For example, a user may press and hold confirm button 316 and action button 318 together for a prolonged length of time (e.g. a few seconds) to indicate to device 202 to invoke the multi-tap input user interface (i.e. a "second user interface") from a default standard interface (i.e. a "first user interface"). An auditory response indicating initiation of the multi-tap input user interface may be given.

Invoking the multi-tap input user interface may automatically invoke a particular device application (e.g. telephone dialing). The application to be automatically initiated may be pre-selectable by a user. Alternatively, operations may remain in the current application.

Upon initiation of the multi-tap user interface, the user presses keys or buttons to invoke associated actions based on the arbitrary input regions defined by the multi-tap input user interface. Pressing any key from a same input region 308-314 is treated equally and invokes the same action (or null action) Multiple presses (i.e. multi-taps) of an input region may cycle through a plurality of potential actions to be invoked which are associated to the input region (e.g. 308 or 312). The confirm button 316 or action button 318 may be used to invoke a desired action selected from the plurality of actions associated with the input regions 308-314.

How the keyboard keys are distributed to various input regions and the action associated with the input regions may be application dependent. For example, the input regions for dialing a telephone number may be different from the input regions for entering text for message composition.

One configuration of the multi-tap keyboard user interface provides a manner to enter alphanumeric and other character input allowing the user to select characters and provide auditory feedback for each character entered. Such a manner of multi-tap entry with auditory confirmation can be used for telephone dialing as further described below and with reference to FIG. 4, for email or other message communication as described with reference to FIGS. 7, 8 and 9A-9C and for other purposes.

Figure 4:
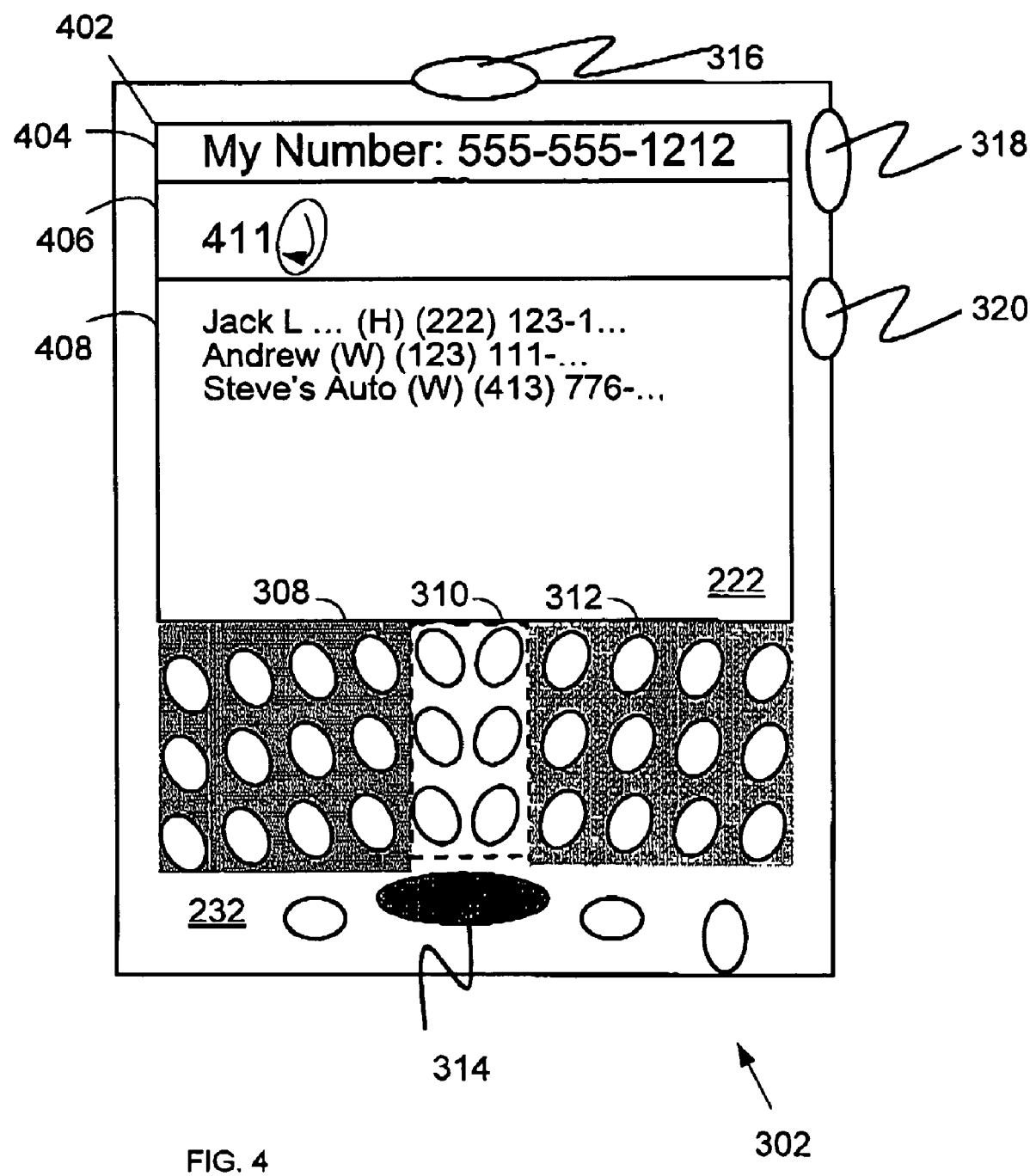
FIG. 4 illustrates an exterior view of a mobile device showing aspects of a multi-tap keyboard interface for telephone dialing in accordance with an embodiment.

Telephone number dialing may be facilitated in a telephone application through a multi-tap user interface. FIG. 4 shows one embodiment wherein display 222 presents a dialing GUI 402 showing a mobile device telephone number display portion 404, a telephone number dialing entry portion 406 and a list of recently dialed telephone numbers portion 408. Persons of ordinary skill in the art will appreciate that more or other information may be presented via dialing GUI 402 but generally common among such GUI's is a telephone number dialing entry portion 406.

To bring up the GUI 402, a telephone application may be invoked (for example, through a specific keystroke combination or a dedicated telephone button 316). Alternatively, a keystroke sequence may invoke multi-tap keyboard user interface mode and to automatically invoke an associated application such as the telephone application as well. With each of the input regions 308, 312 and 314 mapped to various digits 0-9 and symbols (e.g. *,#) and through multi-tap operation, a user can enter a telephone number without the need to see the keyboard. By way of example, input region 308 may be mapped to the digits 0-3, input region 312 to the digits 4-7 and input region 314 to the digits 6 and 9 and symbols *, #. To input a 5 for example, input region 312 may be pressed twice.

To dial the number 411, operations may proceed as follows:

Press action button 318: hear 'enter a number',
Press confirm button 316: accept choice,
Press input region 312 once: input a '4',
Press action button 318 once to skip to next position,
Press input region 308 once: input a '1',
Press action button 318 once: skip to next position,
Press input region 308 once: input a '1',
Press action button 318 twice: hear 'dial the number',
Press confirm button 316: accept choice.

With each input, the multi-tap user interface adapting mobile device 202 responds with auditory feedback. When the user presses the input regions, confirm and action button inputs described above, the user hears 'dial number', '4', 'next', '1', 'next', '1' and 'dialing number'. Other actions that may be supported at various steps in the operations described above may include 'erase number', 'cancel', 'start again', 'clear entry', 'enter voice mail', 'store number' and 'dial stored number' in response to presses of the action and/or confirm buttons 318, 316. If the user accidentally presses the confirm button it may be pressed again to terminate the dialing sequence. Cancel input 320 may also be used.

In an alternative embodiment the input regions 308-314 may be mapped to different entry actions. Input region 308 may provide input for digits 0 to 4. Input region 312 may provide input for digits 5 to 9 while input region 314 may be used to move to the next number. For some users this configuration may allow for faster input since the user would not have to move between keyboard input regions 308-314 and other inputs (e.g. buttons 316-320) such as those along the side of mobile device 202 in the present embodiment to move to the next input.

In another embodiment the movement from one number input to the next could be handled through a timeout. If the user entered a number and then stopped pressing keys for a short predefined period (e.g. "N seconds") the multi-tap user interface to the application may automatically move to the next position and prompt the user with an audible 'enter next character'.

Figure 5A:
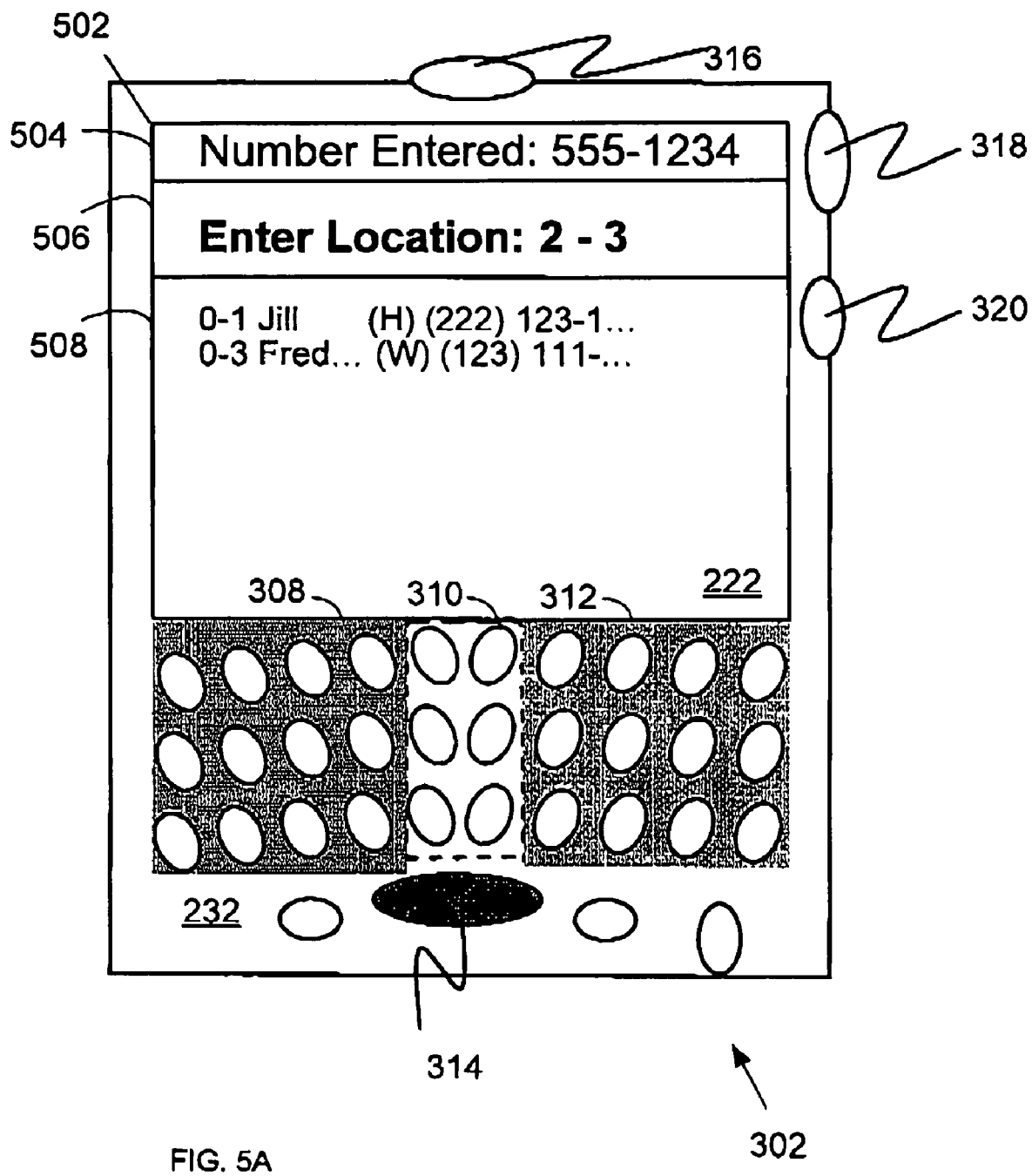
FIGS. 5A and 5B illustrate exterior views of a mobile device showing aspects of a multi-tap keyboard interface for telephone dialing from a stored list of numbers in accordance with an embodiment.
Figure 5B:
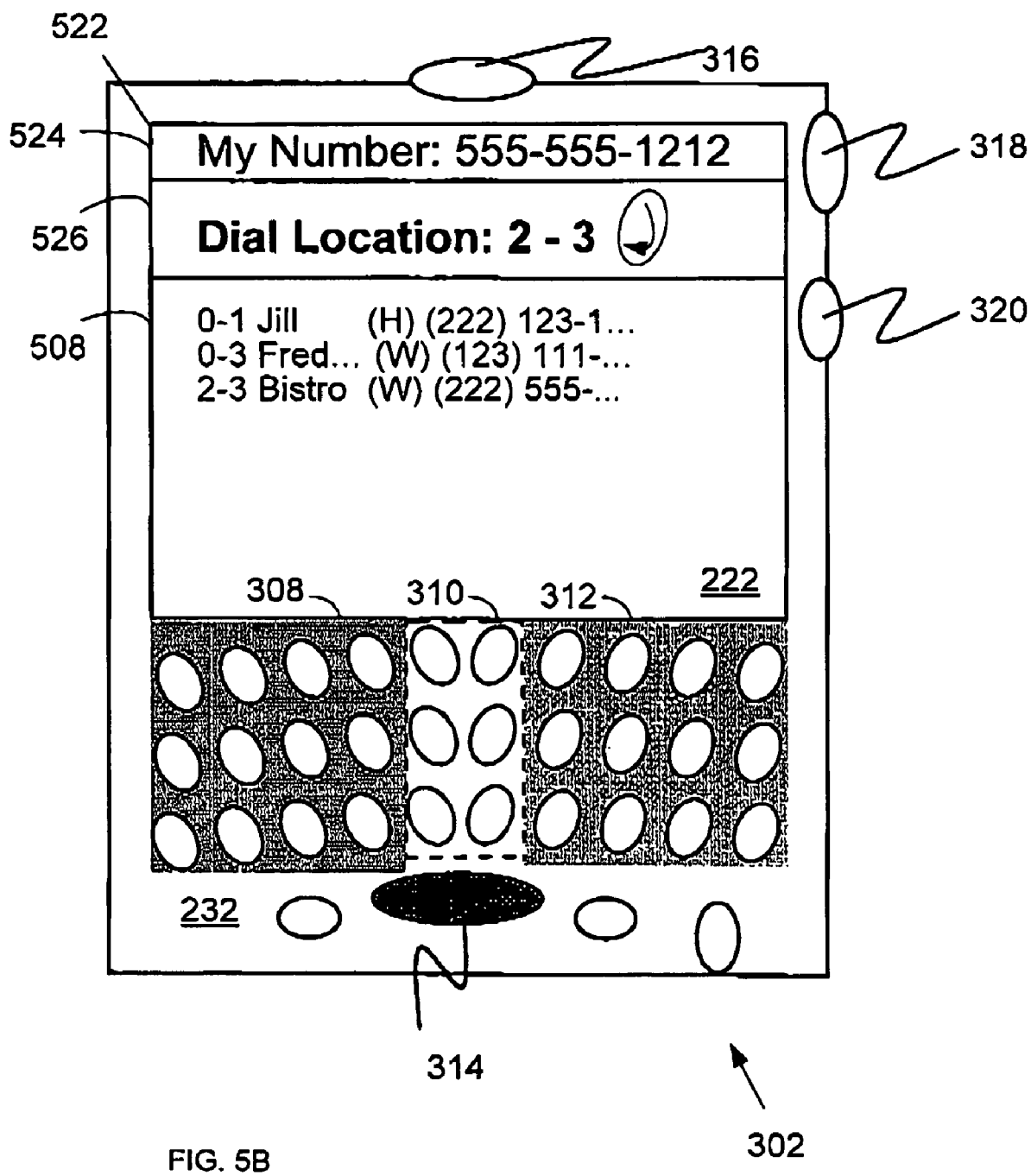

FIGS. 5A and 5B illustrate a further embodiment a multi-tap user interface useful for storing a telephone number to a telephone number list and calling a telephone number stored to such a list. In the present embodiment, a list of telephone number entries may be stored in association with list entry number (e.g. 00-99).

As discussed above, a multi-tap keyboard user interface may be configured for inputting a telephone number. One action option available to a user, once a number is entered, may be to save the telephone number to a location in a list which location may be represented by an entry number from 00 to 99. In other embodiments more or fewer locations may be configured.

To store a number which has been entered by a user as described above, for example, a user presses action button 318 to initiate the presentation of a list of action options by the multi-tap keyboard user interface with auditory feedback. As the user reviews the action options, selectively pressing the action button 318 to move through the choices, mobile device 202 verbalizes the choices to the user. When the user hears 'Save-Number' the confirm button 316 may be pressed to invoke the telephone number list entry saving interface (FIG. 5A). A telephone number list entry saving GUI 502 may be invoked in response. GUI 502 comprises a telephone number entered portion 504, a location entry interface portion 506 and a telephone list display portion 508. As well, input regions 308, 312 and 314 may be associated with actions to input a telephone list location and to save an entered telephone number to such a location. Input region 308 may be configured to enter a number for the tens column and input region 312 to enter a number for the ones column of the location. A user can press input region 308 twice and input region 312 three times to enter and have displayed the value 23 to be used to save the entered telephone number in the list location 23. Input zone 314 may be pressed to hear '2, 3 has been entered'. Pressing the confirm button 316 saves the telephone number to location 23 of the telephone list by the telephone application. In this embodiment a value from 00 to 99 is easily inputted and accepted. However by using the same three active input regions 308, 312 and 314 discussed for entering a phone number, any number of storage locations could be selected. Traditional phones generally also limit the user's storage locations to 99 entries. Even though user's tend to quickly memorize which location holds certain numbers, the choice of 99 locations typically presents more than enough stored numbers for the majority of users.

FIG. 5 illustrates a telephone dialing interface to dial from a list of stored telephone numbers. FIG. 5B shows a dial from stored list GUI 522 comprising a mobile device telephone number display portion 524, similar to portion 304, a location entry interface portion 526, similar to portion 506, and a telephone list display portion 508. Location entry interface portion 526 may display a prompt such as "Dial Location" to prompt entry of a location between 00 and 99 to dial. Using the multi-tap keyboard user interface with auditory feedback, a user need not look at the prompt to be informed as the interface can provide audible assistance as described.

Input regions 308-314 may be similarly mapped to actions for entering a location as described with reference to FIG. 5A; however, action button 318 and confirm 316 invokes a dialing action rather than a saving action.

Figure 6A:
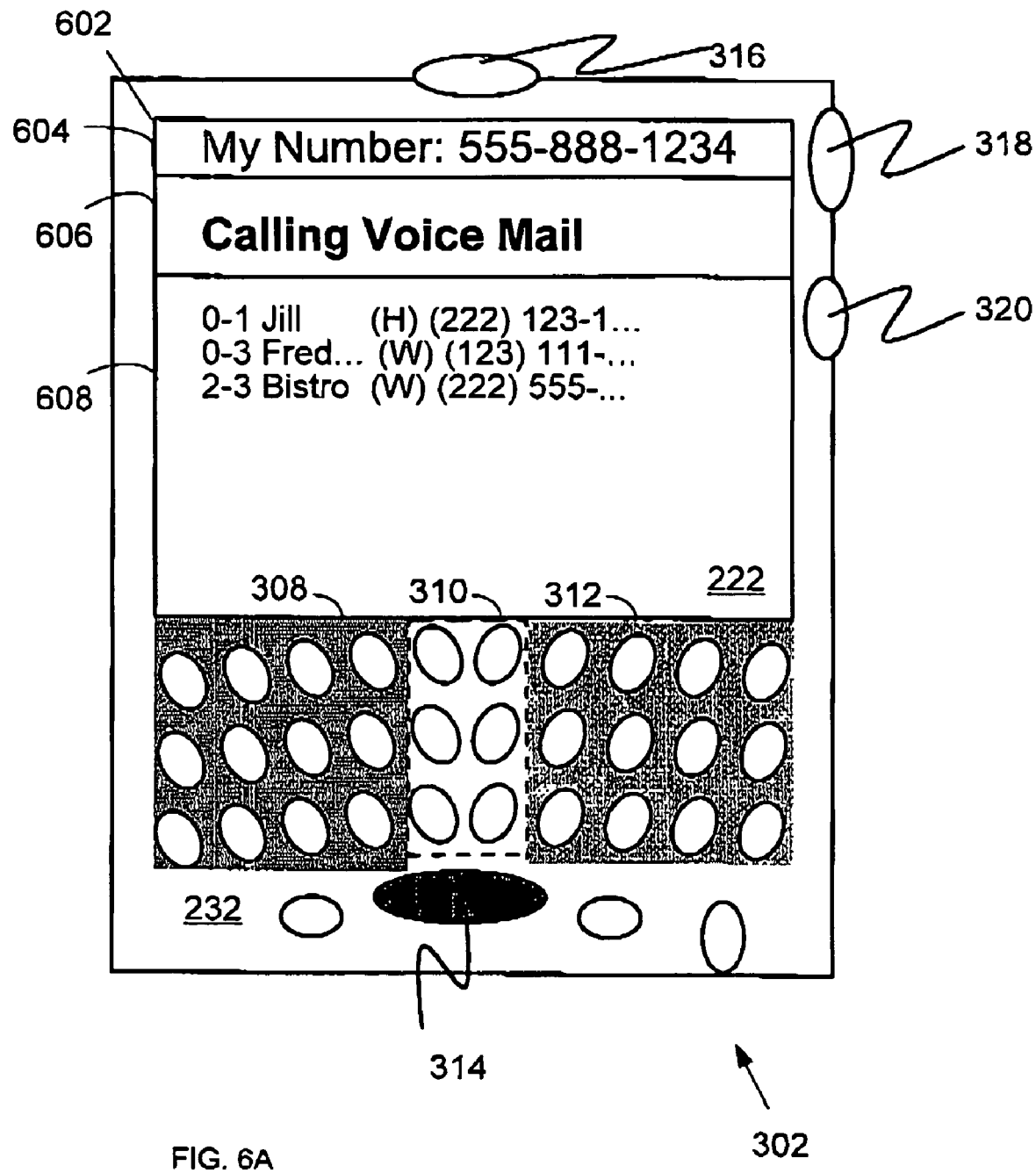
FIGS. 6A and 6B illustrate exterior views of a mobile device showing aspects of a multi-tap keyboard interface for voice mail interaction in accordance with an embodiment.
Figure 6B:
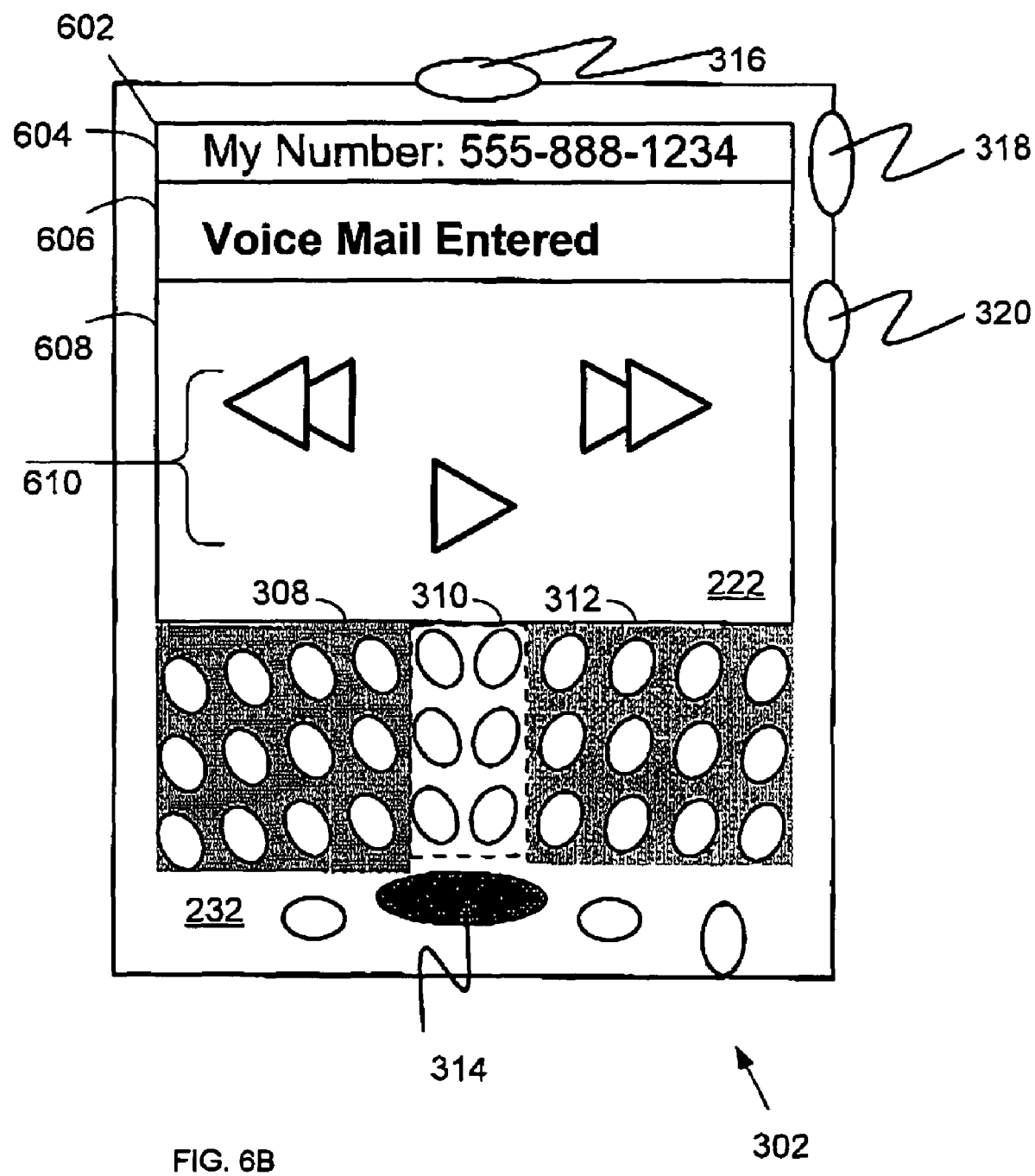

In accordance with a further embodiment, there is provided a manner for navigating in voice mail using a multi-tap system with auditory feedback. FIGS. 6A and 6B illustrate views of a voice mail GUI 602. The GUI may comprise similar elements to the telephone dial from a stored list GUI 502, for example, a mobile device telephone number display portion 604, similar to portion 304, a voice mail prompt display portion 606, and a telephone list display portion 608 similar to portion 508.

The multi-tap keyboard user interface for the telephone application may be configured to present an action to enter voice mail. When a call is missed or if the user just wants to check voice mail the use may invoke the telephone application (for example, using the multi-tap keyboard user interface) and then select through the action button 318 the action 'Enter Voice Mail' to dial a user's voice mail. The auditory feedback associated with the action can confirm 'Calling Voice Mail' through the speaker and via prompt portion 606.

input regions 308-314 can be mapped to actions to navigate through voice mail messages. In this embodiment, input region 308 invokes an action of going back to a previous message, input region 312 invokes an action of going to the next message and input region 314 plays the current message. Input region 310 may again be mapped to a null action. FIG. 6b illustrates a visual metaphor 610 for the mapped input regions on portion 608 of the display.

For advanced operations the action button 318 can be used to select from 'Pause', 'Skip to End', 'Start Over', 'Exit Voice Mail', etc. In response to action choices, auditory feedback provides the verbal description of the action over the speaker. The confirm 316 may be used to select a desired action. In this embodiment, the confirm button 316 need not be used to perform an action indicated via input regions 308-314.

In accordance with a further embodiment, a multi-tap user interface with auditory feedback may be configured to assist a user to control any operational aspect of mobile device 202. Advantageously a complete user interface implementation may be specifically designed for a visually impaired user. In this embodiment all user aspects of the mobile device's systems and operations are handled through the multi-tap keyboard user interface. It is anticipated that many operations will take longer as many of the actions will be confirmed through a auditory output message. Persons of ordinary skill in the art will appreciate that further specific interfaces for various applications (IM, SMS, calculator, address book etc.) commonly found on PDAs and smart phones among others may be adapted according to the teachings herein as set forth in these embodiments.

Figure 7:
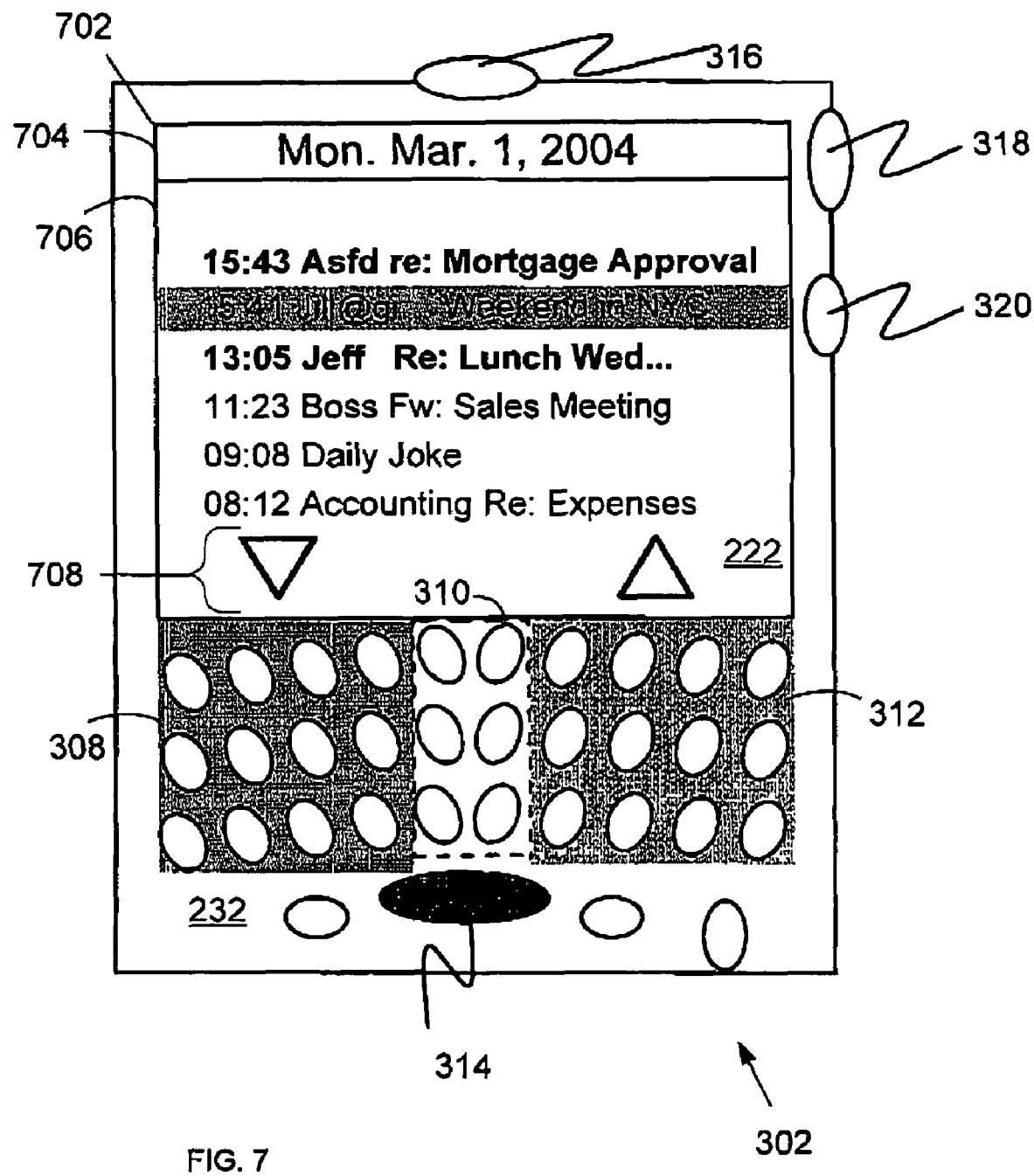
FIGS. 7, 8, 9A-9C and 10 illustrate exterior views of a mobile device showing aspects of a multi-tap keyboard interface for messaging including viewing and composition aspects in accordance with an embodiment.
Figure 8:
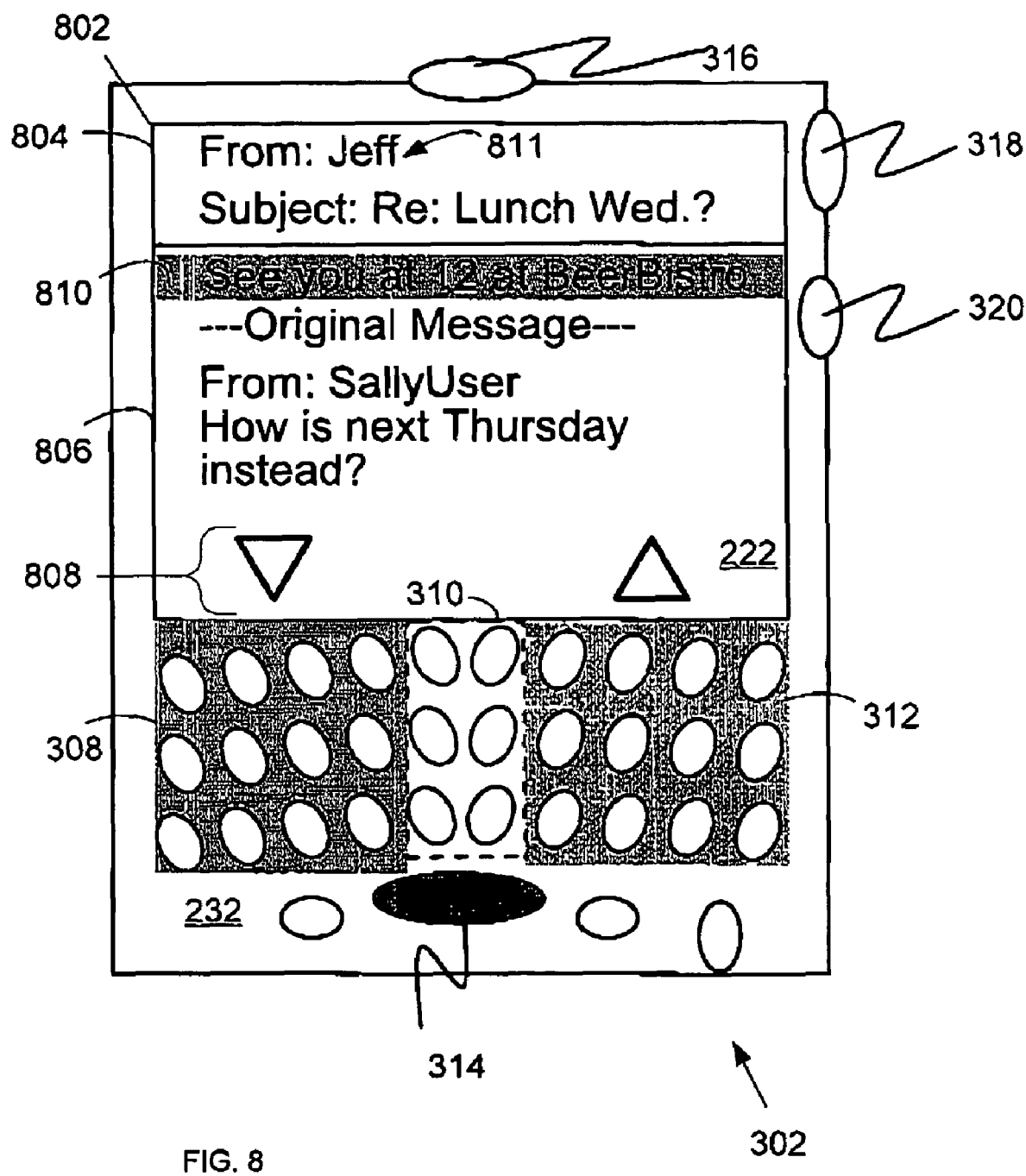
Figure 9:
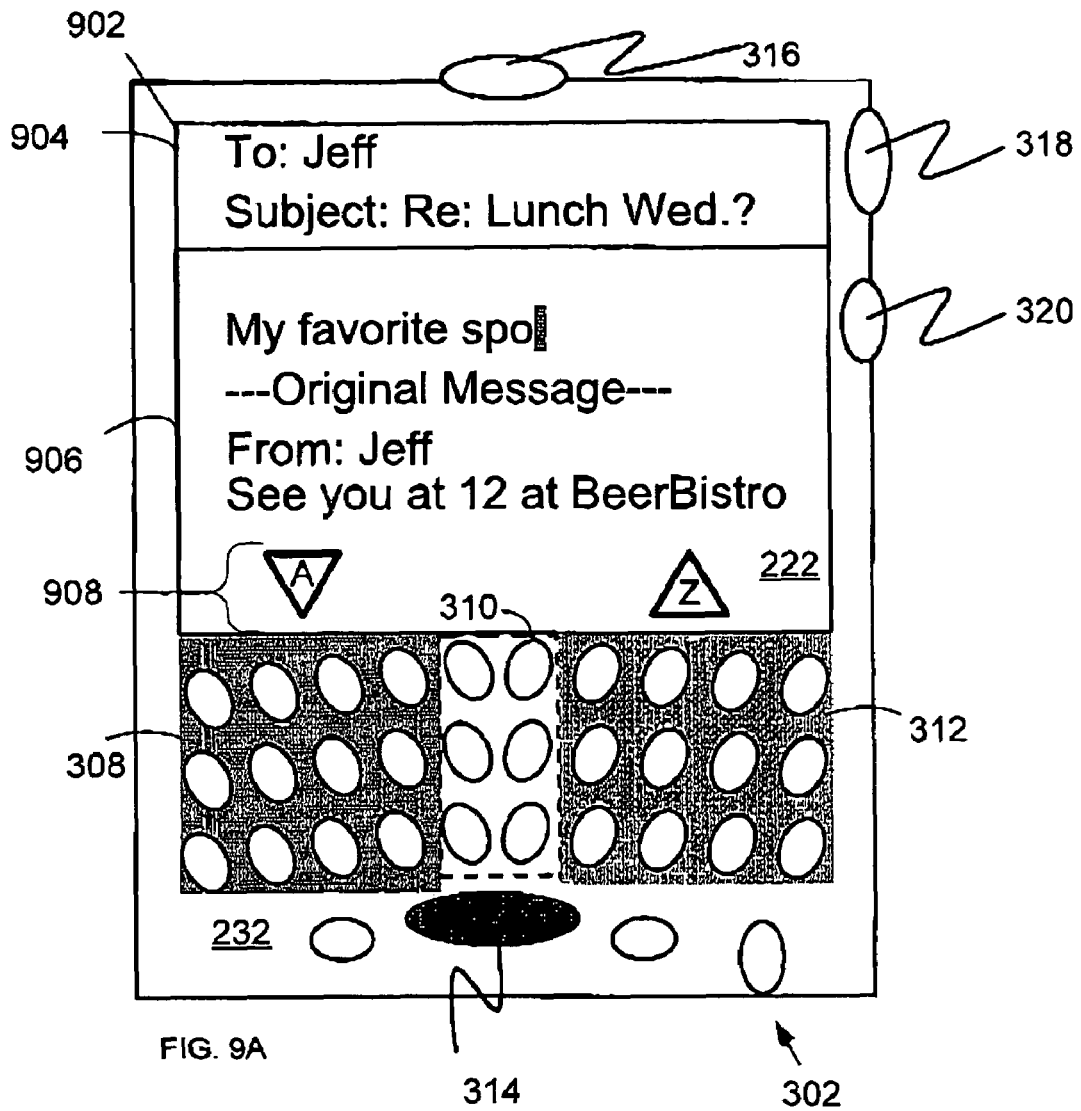

FIGS. 7-9 illustrate a multi-tap keyboard user interface with auditory feedback for electronic mail (email) communications in accordance with an embodiment. FIG. 7 shows a message management application GUI 702 comprising a date portion 704, message list 706 and a visual metaphor 708 representing message navigation actions associated with input regions 308 and 312. In accordance with known techniques a message list of email and other notifications (call log, voice mail, SMS etc.), as desired, may be visually presented to a user via the display. Unread messages are typically distinguished from read messages such as by bolding or other text features. A focus may be moved about the list to select a particular message for further action. A focus may be indicated using reverse video display shading or other features.

In accordance with the present multi-tap embodiment, input zones 308 and 312 are associated with up and down actions to move the focus about the message list 706. Pressing the keys of these input regions 308 and 312 moves the focus in a respective direction and provides a respective auditory feedback such as 'up' and 'down'. If the focus reaches the start or end of the list an appropriate feedback may also be provided (e.g. 'top' or 'bottom'). The action button 318 may be used to be presented with action choices such as: 'Delete', 'Open', 'File', 'Save', 'Forward', 'Reply', 'Reply All' and 'Compose'.

FIG. 8 shows an example of an open message GUI 802 in accordance with an embodiment. Selecting the 'Open' action from the message list 706 invokes an action to open the selected message to determine its contents. The 'Open' action opens the current message to allow the user to navigate (move a focus about the message) over certain areas (typically message fields) to get auditory feedback on the message contents. GUI 802 comprises a message header portion 804, message body portion 806 and visual metaphor display portion 808. A focus 810 for navigating through GUI 802 may be indicated by shading text etc. For example, if the focus 810 is on the 'From' field 811' (not illustrated) within message header portion 804 the user can press input region 314 to confirm the current field and hear through the speaker 'From'. The user can press the action button 318 to be audibly presented with actions to chose from like 'Read Field', 'Delete', 'Forward', 'Reply', 'File', and 'Save'. If the user selects 'Read Field' then mobile device 202, configured with a sub-system for reading characters aloud, reads the content of the field, for example: 'J, e, f, f'. The user can use input regions 308 and 312 as described above with reference to message list navigation, to move the focus to scroll through the open message.

FIG. 9A illustrates a reply interface in accordance with an embodiment. If the user selects the action 'Reply' in an open email or from a current email of a message list, the multi-tap keyboard user interface provides a reply GUI 902 to permit a user to compose a response. Certain message fields are automatically populated such as the subject and recipient address. FIG. 9A shows a representative reply GUI 902 comprising a message header portion 904 and message body portion 906. As well visual metaphors 908 for the input regions may be provided.

In accordance with embodiments of the multi-tap keyboard user interface with auditory feedback, the input regions could be mapped in various ways to facilitate text composition. In the embodiment of FIG. 9A, three active input regions 308, 312 and 314 are associated with the following actions: input region 308 presents the characters A-Z and various special characters in order, for selecting using input region 314. Similarly input region 312 presents the same choices In reverse order beginning with 'Z'. This manner of entry is time consuming but easy for the user to enter.

Alternatively, the alphabet may be distributed among the input regions 306-314 in different ways such as indicated in FIGS. 9B and 9C. As shown in FIG. 9B, input regions 308 and 312 are associated with consonants of the alphabet and input region 314 with vowels. As shown in FIG. 9C, all four input regions 308, 310, 312 and 314 can be associated with groups of letters. The center rows of the keyboard 232 defining input region 310 can be differentiated from other keys such as by forming a protrusion or "bump" on the central keys (typically "G" and "H" of a QWERTY keyboard layout). Appropriate metaphors 908 may be configured for such embodiments (not shown).

Others embodiments for distributing letters and symbols to input regions 308-314 for inputting may be used. For example, input region definitions may be guided by other preferences or schemes such as commonly used letters, location of the letters on a QWERTY keyboard, or shape of each letter (i.e., group round letters together, group stick letters together, etc).

In the embodiment of FIGS. 9B and 9C, after each letter is selected, such as by pausing between multi-tap entry to change the letter or pressing confirm 316, the multi-tap user interface provides an audible feedback of what letter has been selected for entry. The multi-tap user interface with auditory feedback need not be capable of reading text per se, (i.e. reading complete words etc. and performing text to voice conversion, etc.) This is also true for any text received. If the user scrolls over text then each letter can be read out to enable a user to figure out what the message says and who it is from. Such a letter reading sub-system is easier to implement than voice synthesis.

Figure 10:
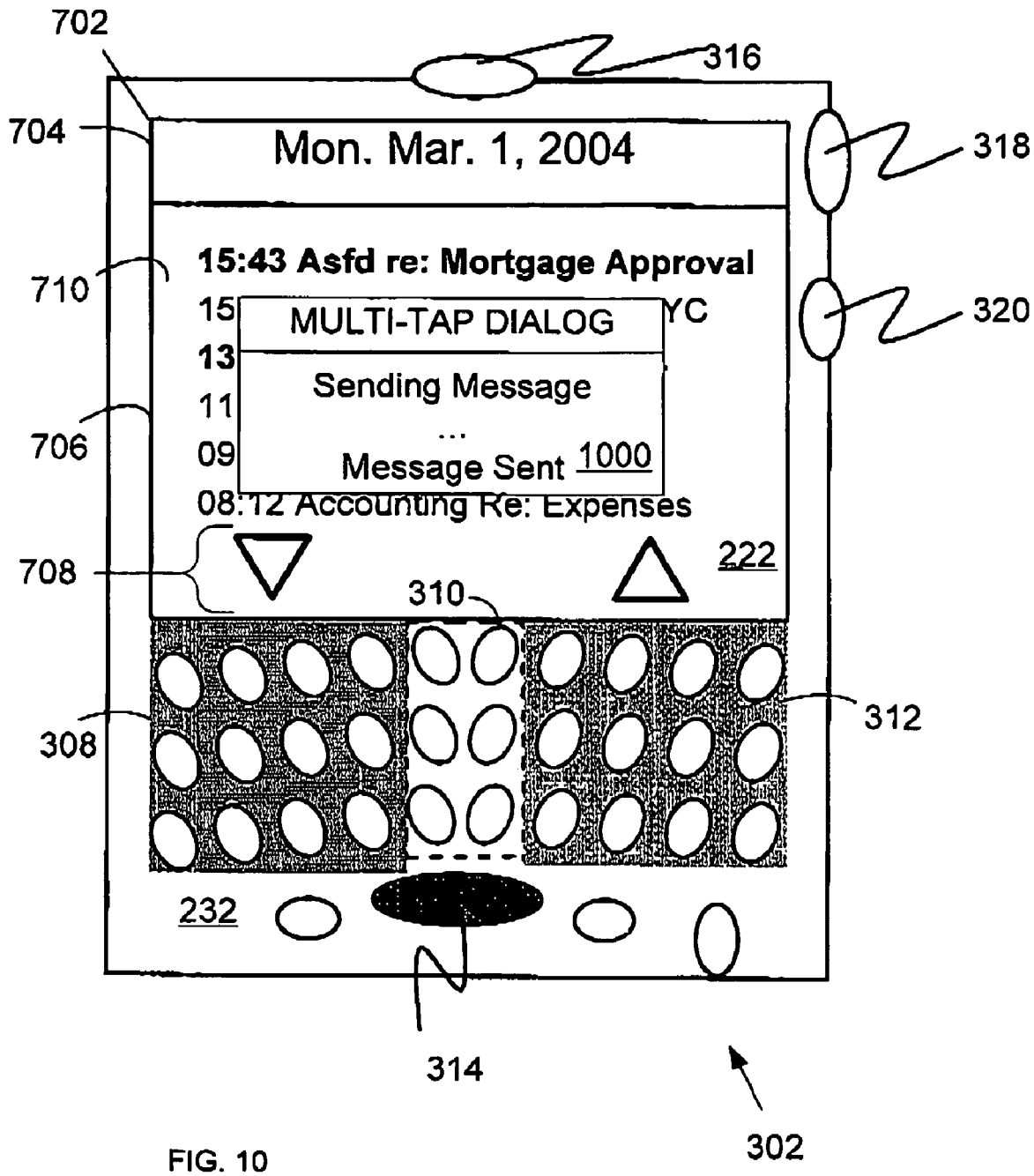

Once message text is entered, the user selects the Action button 318 to perform a send, again using confirm button 316 to confirm the choice. FIG. 10 illustrates a message send interface 1000 for sending a message. The send action may return the user to the message list GUI 702 and provide a message send interface 1000 in an overlay. As well, when device 202 performs the Bend action, auditory feedback such as 'Sending Message' and 'Message Sent' can be presented in response to the send status.

Figure 11:
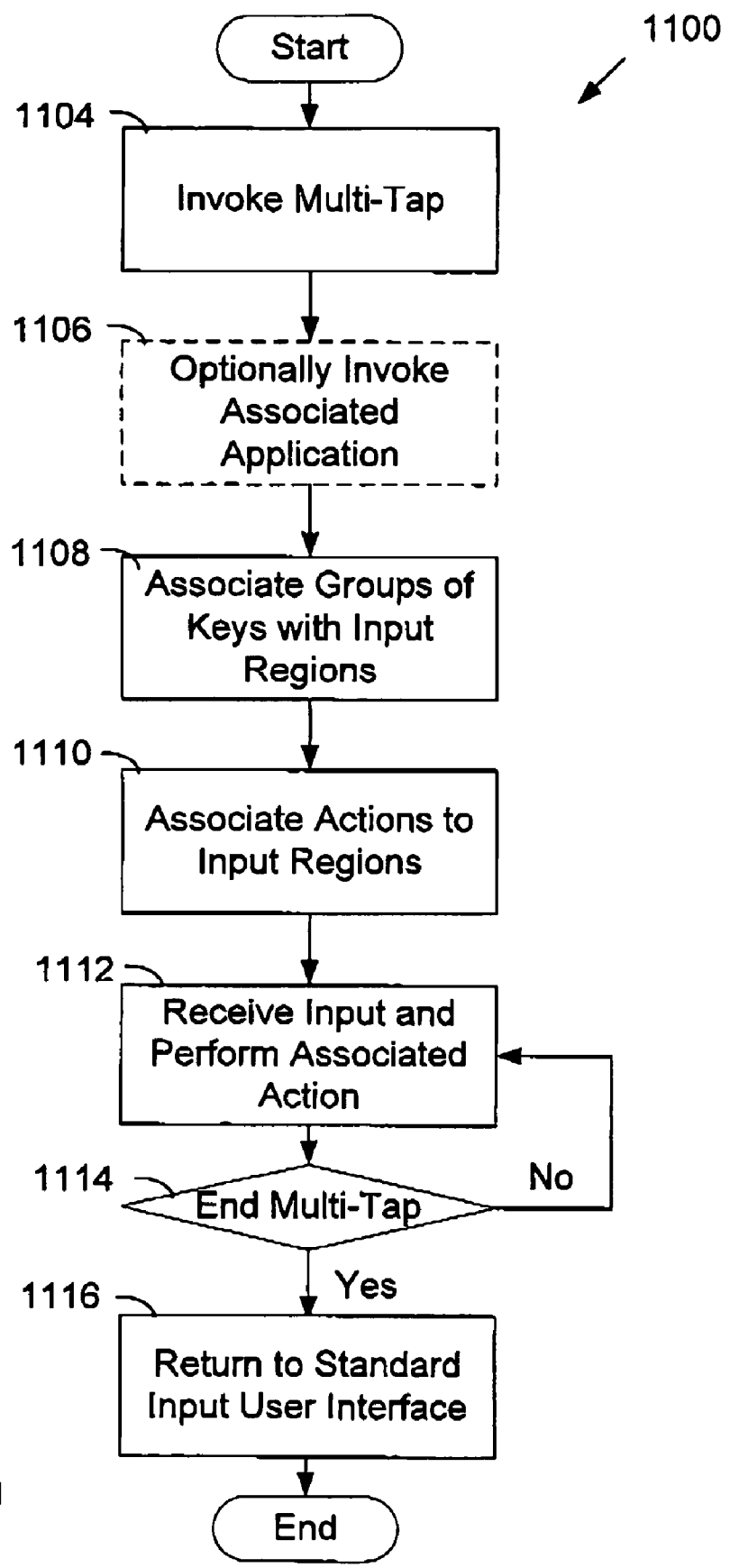
FIGS. 11, 12 and 13 are flowcharts that show operations for a multi-tap keyboard user interface.
Figure 12:
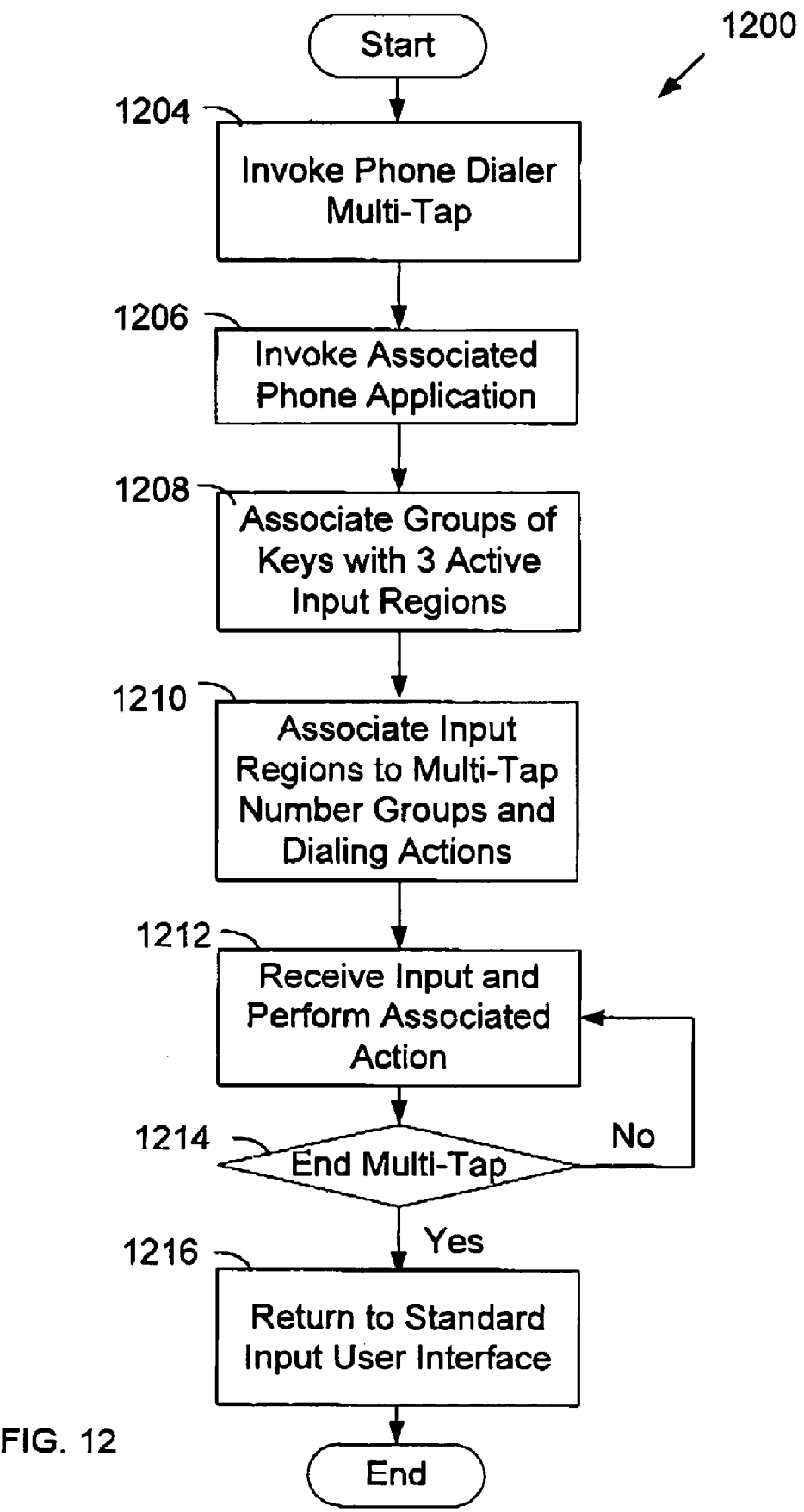
Figure 13:
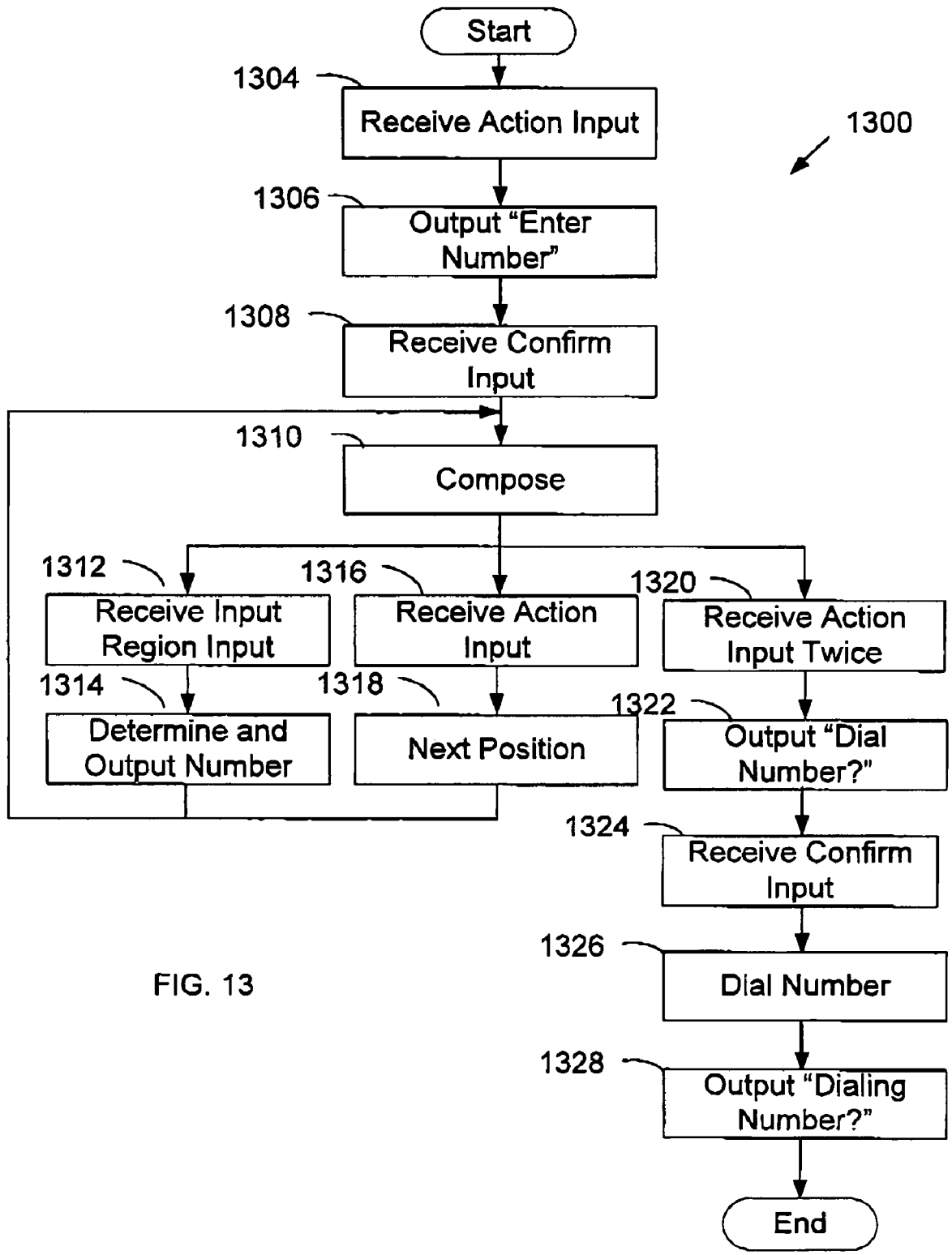

FIGS. 11-13 illustrate multi-tap user interface operations in accordance with embodiments as described above. FIG. 11 provides general operations 1100 for a multi-tap keyboard user interface. Operations start such as at power up of the device. The multi-tap keyboard user interface is invoked at step 1104. Invocation may be automatic upon start-up or in response to a user command through predefined keystrokes etc. The multi-tap keyboard user interface may be associated with a specific application such that invocation of multi-tap also invokes the application (step 1106) or invocation of the application may automatically invoke the multi-tap keyboard user interface.

At step 1108, groups of keys of the keyboard are associated to define input regions. At step 1110, actions are associated to the input regions (e.g. 308-314). Each action typically comprises an operational instruction for the application associated with the multi-tap keyboard user interface and an auditory feedback to the user. A plurality of actions are associated to the action button as well.

At step 1112, input is received and the respective associated action (operation and auditory feedback, if any) is performed in response. That is, input from any one key of a particular input region invokes the same action as input from another key of that region. Repetitive input from a same input region (i.e. a multi-tap) cycles through the actions as applicable. Respective actions associated with the action, confirm, cancel and other inputs are also performed.

Steps 1112-1114 are repeated until the multi-tap keyboard user interface mode is ended (for example by a defined keystroke combination or exiting an associated application). Thereafter, at step 1116, a standard input user interface is resumed and operations 1100 end.

FIG. 12 illustrates operation 1200 for dialing a telephone number using a multi-tap keyboard user interface with auditory feedback. Operations 1200 start and a multi-tap keyboard user interface mode is invoked to dial a telephone number such as by pressing a dedicated phone button (step 1204). The associated telephone application is also invoked at step 1206. In the present embodiment as described previously with respect to FIG. 4, groups of keyboard keys are associated to define three active input regions at step 1210. A dead zone may be defined between regions if desired. The input regions are associated to respective number groups (digits and symbols #, *) at step 1210. At steps 1212-1214, input is received and appropriate actions are performed as described more fully with respect to FIG. 13. Input may comprise action, confirm, cancel, input region or other input. Upon the end of multi-tap keyboard user interface mode (such as by exiting the associated application), multi-tap keyboard user interface mode is terminated and a standard interface is resumed (step 1216) before operations 1200 end.

FIG. 13 illustrates specific example operations 1300 for telephone number dialing. Operations 1300 may be invoked from a telephone application. At step 1304 the action button input is received and at step 1306, an auditory feedback is presented to indicated the interface is ready to receive a number to dial. Though not shown subsequent action button inputs would cycle through various action choices. At step 1308 the confirm button is received and at sep 1310 composition of the number begins wherein inputs from the input regions are used to select desired numbers and/or symbols for composing the number to be dialed. At steps 1312-1314 an input region input is received and a number determined. The number is preferably output to the display and speaker. Multi-tap inputs to the same input region cycles through the numbers associated to the region. An action button input moves the composition to the next position (steps 1316-1318). A double click of the action button invokes a dialing confirmation (steps 1320-1322) to provide a user with an auditory feedback requesting confirm button input. At step 1324 confirm button input is received and at steps 1326-1328 the number is dialed with auditory feedback before operation 1300 end. Though not shown, persons of ordinary skill in the art will appreciate that cancel button input may be employed to abort operations 1300.

It is recognized that individual character enunciation and the replacement or enhancement of a primarily visual interface with a multi-tap keyboard user interface with auditory feedback as shown and described is likely to result in a more time-consuming user experience compared to existing usage. However, advantageously, the multi-tap keyboard user interface enables the use of existing smart phones and wireless PDAs without hardware changes by providing a software-based adaptation.

Figure 14:
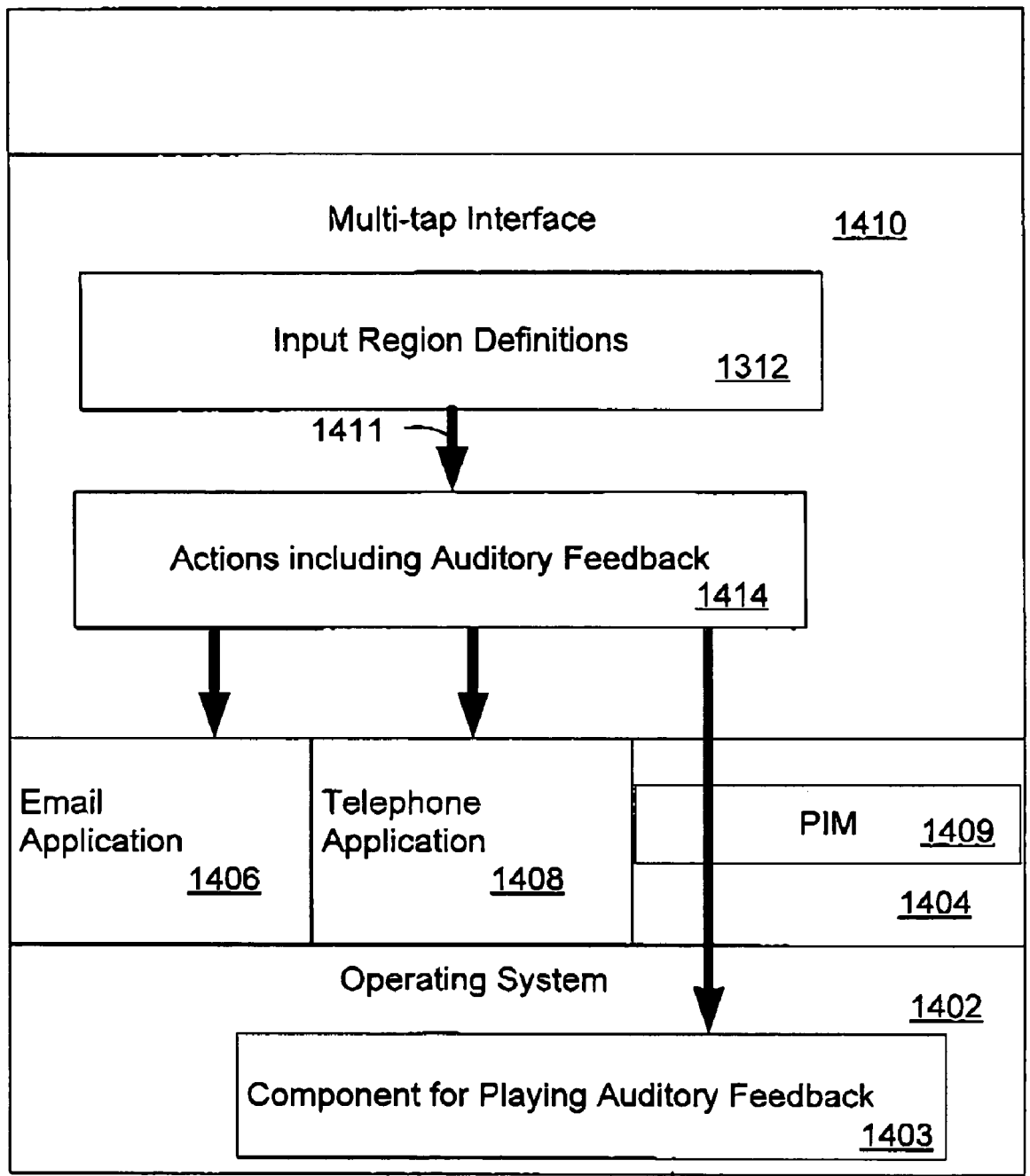
FIG. 14 is a schematic diagram of a memory portion of FIG. 2 in accordance with an embodiment.

Referring now to FIG. 14, there is an illustration of an example of memory 300 of device 202, in accordance with an embodiment, showing various software components for controlling mobile device 202. Memory 300 comprises an operating system 1402 including a component for playing back recorded sounds 1403 such as auditory feedback. Also included are a plurality of applications 1404 including an email application 1406, telephone application 1408 among others (not shown) such as a calendar component, alarm component, address book, IM component, Web browser. A PIM application component 1409 described previously, provides an interface for managing a plurality of application components particularly for messaging. Persons of ordinary skill in the art will appreciate that one or more additional components or duplicate components e.g. two IM components operating different IM services may be included (not shown) and that not all of the components 1404 or others need be included.

A multi-tap keyboard user interface with auditory feedback component 1410 ("multi-tap keyboard user interface component") for handling inputs from input devices on behalf of some or all of application components 1404 is provided. The multi-tap keyboard user interface component 1410 interfaces with various input, output or I/O devices of device 202 such as keyboard 232, display 222, auxiliary I/O devices 228 and speaker 234. Preferably speaker 234 is an earpiece or headset coupled to the mobile device 202. Multi-tap keyboard user interface component 1410 comprises input region definitions 1412 associating various keyboard keys to input regions such that an input from any key of a same region may be treated equally by the multi-tap keyboard user interface component 1410. Input regions and other input keys and buttons such as an action button are associated (denoted by arrow 1411) to respective actions with auditory feedback 1414 for controlling operation of device 202. Such actions are generally determined with reference to an application which the multi-tap keyboard user interface component is providing a user interface to control operations of the device. Thus multi-tap keyboard user interface component may comprise actions for, among other things, composing and dialing a telephone number, dialing a number from a list of stored telephone numbers and for storing numbers to a list, calling to and listening to voice mail, and electronic message communication including, message navigating, reviewing, composing and sending.

Though illustrated as separate components with bright line distinctions, persons of ordinary skill in the art will appreciate that operations may be shared among various components or overlapped and such component distinctions may be artificial. For example, though shown as an operating system component, playback component 1403 may be provided by multi-tap keyboard user interface component 1410 or another component.

The above-described embodiments of the present application are intended to be examples only. Those of skill in the art may effect alterations, modifications and variations to the particular embodiments without departing from the scope of the application. The subject matter described herein in the recited claims is intended to cover and embrace all suitable changes in technology.

What is claimed is:

1. A method for dialing a destination using a mobile device comprising a plurality of input devices comprising a plurality of keys providing respective different inputs in accordance with a first user interface, the method comprising:
    (i) associating groups of one or more keys of a mobile device to define a plurality of input regions, at least three of said input regions having a plurality of keys, whereby a keying from any key of a same input region defines a same input;
    (ii) associating auditory responses and actions for operating the device to respective inputs receivable from input devices of the mobile device including the keys of the at least one input region in accordance with a second user interface, at least a one of the input regions associated with actions to input a character from a respective set of characters for composing a destination for inputting into the device such that repeating an input from a same input region selects a different character from the respective set and at least one of the input regions comprising a plurality of keys associated with a null action to define a dead input region to separate at least some of the other input regions associated to respective actions for dialing a destination; and
    (iii) for each input received from said input devices, performing the respective action and outputting the respective auditory response associated with each input thereby to dial a destination
    wherein at least one of the actions comprises repeating at least steps (ii) and (iii) thereby to associate different auditory responses and actions with the inputs receivable for subsequent operation of the mobile device and further wherein a one of the at least one of the actions initiates a dialing function to recall a destination stored for subsequent dialing thereby to associate the input regions with said different auditory responses and actions to input a reference to recall the destination for dialing.

2. The method of claim 1 wherein the characters for composing a dialing destination comprise 0, 1, 2, 3, 4, 5, 6, 7, 8, 9, #, and * allocated among the respective sets associated with respective input regions.

3. The method of claim 1 wherein respective inputs from one or more of the input devices are associated with at least one of: an action to select a current action from a plurality of actions; an action to confirm a current action; and an action to cancel a current action.

4. The method of claim 1 wherein a one of the at least one of the actions initiates a dialing function to store a destination for subsequent dialing thereby to associate the input regions with said different auditory responses and actions to input a reference to store the destination for dialing.

5. The method of claim 4 wherein said repeating defines a first and a second input region for inputting respective portions of the reference to store the destination.

6. A mobile device comprising:
    a communication system for transmitting and receiving communications via a communication network;
    a processor coupled to the communication system for communications;
    a plurality of input devices comprising a plurality of keys providing respective different inputs in accordance with a first user interface; and
    memory coupled to the processor for storing instructions to configure the processor to control operation of the mobile device via the plurality of input devices, the instructions configuring the processor to:
        (i) associate groups of one or more keys of said input devices to define a plurality of input regions, at least three of said input regions having a plurality of keys, whereby a keying from any key of a same input region defines a same input;
        (ii) associate auditory responses and actions for operating the device to respective inputs receivable from input devices of the mobile device including the keys of the at least one input region in accordance with a second user interface, at least a one of the input regions associated with actions to input a character from a respective set of characters for composing a destination for inputting into the device such that repeating an input from a same input region selects a different character from the respective set and at least one of the input regions comprising a plurality of keys associated with a null action to define a dead input region to separate at least some of the other input regions associated to respective actions for dialing a destination; and
        (iii) for each input received from said input devices, performing the respective action and outputting the respective auditory response associated with each input thereby to dial a destination,
    wherein at least one of the actions comprises repeating at least steps (ii) and (iii) thereby to associate different auditory responses and actions with the inputs receivable for subsequent operation of the mobile device and further wherein a one of the at least one of the actions initiates a dialing function to recall a destination stored for subsequent dialing thereby to associate the input regions with said different auditory responses and actions to input a reference to recall the destination for dialing.

7. A computer readable memory storing instructions and data for configuring a processor of a mobile device, when executed, to control operation of the mobile device via a plurality of input devices comprising a plurality of keys providing respective different inputs to the mobile device in accordance with a first user interface, the instructions configuring the processor to:
    (i) associate groups of one or more keys of said input devices to define a plurality of input regions, at least three of said input regions having a plurality of keys, whereby a keying from any key of a same input region defines a same input;
    (ii) associate auditory responses and actions for operating the device to respective inputs receivable from input devices of the mobile device including the keys of the at least one input region in accordance with a second user interface, at least a one of the input regions associated with actions to input a character from a respective set of characters for composing a destination for inputting into the device such that repeating an input from a same input region selects a different character from the respective set and at least one of the input regions comprising a plurality of keys associated with a null action to define a dead input region to separate at least some of the other input regions associated to respective actions for dialing a destination; and (iii) for each input received from said input devices, performing the respective action and outputting the respective auditory response associated with each input thereby to dial a destination, wherein at least one of the actions comprises repeating at least steps (ii) and (iii) thereby to associate different auditory responses and actions with the inputs receivable for subsequent operation of the mobile device and further wherein a one of the at least one of the actions initiates a dialing function to recall a destination stored for subsequent dialing thereby to associate the input regions with said different auditory responses and actions to input a reference to recall the destination for dialing.

* * * * *